(12) United States Patent
Park et al.

(10) Patent No.: US 12,399,090 B2
(45) Date of Patent: Aug. 26, 2025

(54) TRANSPARENTIZING PRETREATMENT METHOD OF BIOLOGICAL SAMPLE HAVING SIZE OF AT MOST 1 MM, AND TRANSPARENTIZING METHOD OF BIOLOGICAL SAMPLE INCLUDING SAME

(71) Applicants: KOREA RESEARCH INSTITUTE OF CHEMICAL TECHNOLOGY, Daejeon (KR); SEOUL NATIONAL UNIVERSITY R&DB FOUNDATION, Seoul (KR)

(72) Inventors: Sun-Hyun Park, Daejeon (KR); Ki-Suk Kim, Daejeon (KR); Jae-Meun Lee, Daejeon (KR); Jae-Hyeok Lee, Daejeon (KR); Seong-Hoon Park, Daejeon (KR); Ji Yeoun Lee, Seoul (KR); Jinju Park, Seoul (KR)

(73) Assignees: KOREA RESEARCH INSTITUTE OF CHEMICAL TECHNOLOGY, Daejeon (KR); SEOUL NATIONAL UNIVERSITY R&DBFOUNDATION, Seoul (KR)

( * ) Notice: Subject to any disclaimer, the term of this patent is extended or adjusted under 35 U.S.C. 154(b) by 209 days.

(21) Appl. No.: 18/010,906

(22) PCT Filed: May 28, 2021

(86) PCT No.: PCT/KR2021/006658
§ 371 (c)(1),
(2) Date: Dec. 16, 2022

(87) PCT Pub. No.: WO2021/256723
PCT Pub. Date: Dec. 23, 2021

(65) Prior Publication Data
US 2023/0236094 A1    Jul. 27, 2023

(30) Foreign Application Priority Data
Jun. 16, 2020  (KR) .................. 10-2020-0073270

(51) Int. Cl.
G01N 1/30    (2006.01)
(52) U.S. Cl.
CPC ......... G01N 1/30 (2013.01); *G01N 2001/305* (2013.01)

(58) Field of Classification Search
CPC ....... G01N 1/30; G01N 2001/305; G01N 1/36
See application file for complete search history.

(56) References Cited

U.S. PATENT DOCUMENTS

| 11,022,528 B2 | 6/2021 | Park et al. |
| 11,365,213 B2 * | 6/2022 | Kim .................. G01N 1/30 |

FOREIGN PATENT DOCUMENTS

| JP | 2013522590 A | 6/2013 | |
| JP | 2018-185297 A | 11/2018 | |
| JP | 2020513573 A | 10/2021 | |
| KR | 10-1563826 B1 | 10/2015 | |
| KR | 10-2019-0094509 A | 8/2019 | |
| KR | 10-2115674 B1 | 6/2020 | |
| WO | WO-2018194253 A1 * | 10/2018 | ........... A61K 31/575 |
| WO | WO 2018/224289 A1 | 12/2018 | |
| WO | WO 2019/151838 A1 | 8/2019 | |

OTHER PUBLICATIONS

Zhao, S. Cellular and Molecular Probing of Intact Human Organs, Feb. 20, 2020, Cell, 180(4): 796-812 (Year: 2020).*
Qian X, et al. Brain organoids: advances, applications and challenges, 2019, Development, 146(8): 1-12 (Year: 2019).*
Ke, M-T, et al. Optical Clearing and Index Matching of Tissue Samples for High-resolution Fluorescence Imaging Using SeeDB2, 2018, Bio-protocol, 8(20): 1-13 (Year: 2018).*
Cox et al. (2019) "Development of organoids from pituitary as novel research model to study pituitary stem cell biology" Dissertation, KU Leuven Doctoral School Biomedical Sciences, 120pp.
International Search Report of International Application PCT/KR2021/006658, mailed Sep. 24, 2021.

* cited by examiner

*Primary Examiner* — Blaine Lankford
(74) *Attorney, Agent, or Firm* — LEYDIG, VOIT & MAYER, LTD.

(57) ABSTRACT

A clearing pretreatment method of a biological sample having a size of at most 1 mm, that is, a spheroid or organoid, according to the present invention uses a phosphate-buffered saline (PBS) rather than a conventional sucrose solution as a pretreatment solution, thus solving the problem in which the spheroid or organoid floats above the surface of water due to the density difference such that the structure of the sample is damaged. Therefore, there is an effect in that the spheroid or organoid can be transparentized while maintaining the original shape thereof, thus making it possible to image deep parts.

6 Claims, 4 Drawing Sheets

Glioblastoma with Cerebral Organoids

37°C/5.0% CO2/75 rpm

Tissue clearing

Before tissue clearing
(embedded into 0.8% agarose)

After tissue clearing

Lightsheet imaging after Tissue clearing
Hoechst/Vimentin/Tuj1

Lightsheet imaging after Tissue clearing  Hoechst/Vimentin/Tuj1

Hoechst postive cell counting
:9145 cells/0.585 x 0.585 x 0.300 μm$^3$

TRANSPARENTIZING PRETREATMENT METHOD OF BIOLOGICAL SAMPLE HAVING SIZE OF AT MOST 1 MM, AND TRANSPARENTIZING METHOD OF BIOLOGICAL SAMPLE INCLUDING SAME

CROSS-REFERENCE TO RELATED APPLICATIONS

This application is a U.S. National Stage Application filed under 35 U.S.C. § 371 of International Application No. PCT/KR2021/006658, filed May 28, 2021, which claims the benefit of Korean Application No. KR 10-2020-0073270, filed Jun. 16, 2020. Both of these applications are hereby incorporated by reference in their entireties.

TECHNICAL FIELD

The present invention relates to a clearing pretreatment method of a biological sample having a size of 1 mm or less, and a clearing method of the biological sample including the same.

BACKGROUND ART

Tissue clearing techniques enable the examination of the protein distribution and internal structure of biological tissues and surpass the limits of observation in existing technologies to observe deep parts of tissue structures. In addition, tissue clearing techniques enable access to integrated structures and molecular information obtained from various organ systems. As a result, recently, techniques of tissue clearing have been recently developed into various methods.

Antigen integrity has been reported in tissues that have been treated by clearing techniques such as Spatleholz, BABB, Scale S, and iDISCO method, which are tissue clearing processes using an organic solvent, and active CLARITY technology (ACT) method, which is a polymer flooding method. In the case of methods other than ACT, there is a problem in that the integrity of fluorescence and antigen is deteriorated. In the case of ACT, the integrity of antigen is 90% or more, which exhibits higher integrity than methods, such as CLARITY that further require binding of fixed proteins to hydrogel polymers. However, a strong tissue fixation process causes a loss of antigenicity, and there are still problems to be considered such as a decrease in the number of usable antibodies and the like. As a result, improvement in various techniques is required.

On the other hand, there is another major problem in the clearing of biological tissues with the use of spheroids or organoids having a size of 1 mm or less. In order to perform tissue clearing methods, the preservation of protein through pretreatment with 40% sucrose (Patent Document 1, KR 10-2017-0105551) is important. However, small spheroids or organoids with a size of 1 mm or less float on a sucrose solution due to a lower density than that of sucrose. As a result, the spheroids or organoids, which are fragile tissues, are severely damaged when shaking the samples. In addition, the samples are easily lost since researchers cannot observe the samples with bare eyes due to the small size of the spheroids or organoids.

In addition, in order to establish an authentication system to evaluate the efficacy and toxicity of new drugs for spheroid-screening kits and organoid-screening kits, technologies capable of rapid three-dimensional imaging and quantification are required. However, currently, there are difficulties in rapid construction of three-dimensional images and quantification of organoids.

In order to obtain a three-dimensional image of human-derived cancer tissue organoids, a confocal microscope and the like are generally used, which enables obtaining of thickness information in the level of several tens of micrometers. The above thickness is limited in some degree by the depth through which the light source can penetrate. However, since organoid structures have a size of several hundred micrometers or more, only partial information can be acquired in such a manner. Therefore, in order to acquire the internal information of a rather thick tissue, a series of processes, which includes fabricating continuous sections each having a thickness of several tens of micrometers, imaging each of the sections through a microscope one by one, and then reconstituting the sections into one, is required. However, since the samples of organoids are fragile, problems that can occur during the series of cutting and pasting processes arise exponentially.

In addition, in order to three-dimensionally evaluate the efficacy and toxicity of new drugs in living cells, techniques of observing images in new methods are required.

The present invention relates to a development of an alternative solution capable of solving the problems occurring when clearing spheroids or organoids having a size of 1 mm or less, the problem of samples, such as spheroids or organoids, being severely damaged in a pretreatment process with 40% sucrose due to fragile tissue and being easily lost since researchers cannot observe the samples with bare eyes due to the small size of the spheroids or organoids.

In order to inhibit the tissue from floating above due to the density, a solution with a low density, which is capable of protecting the protein from being damaged in the clearing solution, was observed through experiments. As a result, when fixing the tissue with 4% PFA and incubating the same with 1×PBS for 24 hours, the same effect as when using 40% sucrose could be observed in the brain of a fluorescent gene tissue mouse. When applying the above solution to small samples such as spheroids or organoids, the problem of the tissue floating above can be solved, thereby solving the problem of the tissue being damaged. In addition, since researchers can confirm the sample location, the existing problem caused previously can be solved.

In addition, the present invention enables the quantification and construction of three-dimensional images of living cells faster than the existing confocal microscopes with the recently developed Leica THUNDER imager 3D microscope for rapid three-dimensional imaging of human-derived cancer organoids. In addition, the tissue clearing technique of the present invention enables the examination of the internal structure and distribution of protein without damaging human-derived cancer organoids, thereby enabling the observation of deep parts of tissue structure while surpassing the limits of observation in the existing techniques and enabling access to integrated structures and molecular information obtained from various organ systems. Furthermore, a kit for human-derived cancer organoids of the present invention is a kit to which a method of reducing the damage of cancer organoid structures that can occur in a clearing process is applied.

Hence, techniques of high-throughput imaging and clearing have been applied to human-derived cancer organoids to establish a protocol allowing researchers to easily screen the efficacy and toxicity of new drugs. In addition, by applying clearing methods to human-derived cancer organoids, the invention of a kit enabling researchers to easily perform rather precise analysis and evaluation at the same time has been completed.

On the other hand, Patent Document 2 (KR 10-2018-0013747) provides a method of clearing spheroids using a clearing agent (CHAPS and urea). A clearing composition including the clearing agent (CHAPS and urea) can easily and quickly transparentize the spheroids, and thus can be effectively used for imaging of spheroids. In addition, Patent Document 2 discloses that the clearing composition can be effectively used for the identification of causes of various diseases, treatments, and prediction of the efficacy and toxicity of drugs. In this case, the present invention discloses that sharp fluorescent images of transparentized spheroids can be obtained with the use of a clearing agent to the spheroids. In addition, such sharp fluorescent images can be effectively used for the identification of causes of various diseases, treatments, and prediction of the efficacy and toxicity of drugs. Furthermore, before inducing clearing by treatment with the clearing agent, damage (denaturation) to a spheroid or an organoid can be minimized, thereby inducing clearing well enough and making it possible to image deep parts. Moreover, there is a difference with the above-mentioned related art in that pretreatment with a PBS solution is additionally performed to overcome the problem emerging from the existing pretreatment solution (saccharide solution, sucrose).

That is, the present invention has effects of overcoming the problems of the spheroids or organoids floating above the surface of the pretreatment solution due to the density difference, which makes the pretreatment process difficult and causes damage to the fragile tissue. Therefore, the present invention has been proven to be usefully applied to clearing of the spheroids and organoids, and then completed.

DISCLOSURE

Technical Problem

In an aspect, an objective of the present invention is to provide a clearing pretreatment method of a biological sample having a size of 1 mm or less, the method including a biological sample that is fixed and has a size of 1 mm or less with a pretreatment solution including phosphate-buffered saline (PBS).

In another aspect, another objective of the present invention is to provide a clearing method of a biological sample having a size of 1 mm or less, the method including:
pretreating a biological sample that is fixed and has a size of 1 mm or less with a pretreatment solution including phosphate-buffered saline (PBS); and
clearing the resulting pretreated biological sample by bringing the pretreated biological sample into contact with a clearing agent including a compound represented by Formula 1, an optical isomer of the compound represented by Formula 1, a hydrate of the compound represented by Formula 1, or a salt of the compound represented by Formula 1.

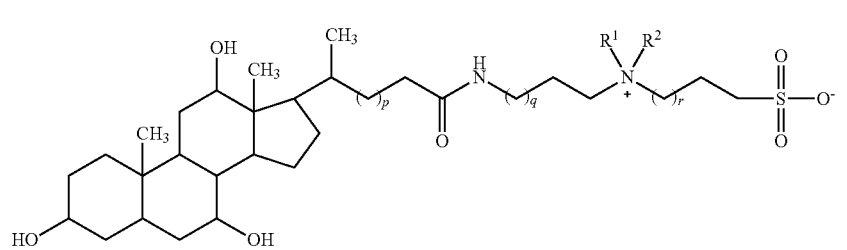

[Formula 1]

In Formula 1,
$R^1$ and $R^2$ are each independently a straight-chain alkyl group or branched-chain alkyl group having 1 to 10 carbon atoms, and
p, q, and r are each independently integers in a range of 0 to 10.

In a further aspect, a further objective of the present invention is to provide a clearing pretreatment composition for a biological sample having a size of 1 mm or less, the composition including phosphate-buffered saline (PBS).

In a yet further aspect, a yet further objective of the present invention is to provide a clearing kit for a biological sample having a size of 1 mm or less, the kit including: a clearing pretreatment composition for a biological sample having a size of 1 mm or less, the composition including phosphate-buffered saline (PBS); and
a clearing agent including a compound represented by Formula 1, an optical isomer of the compound represented by Formula 1, a hydrate of the compound represented by Formula 1, or a salt of the compound represented by Formula 1.

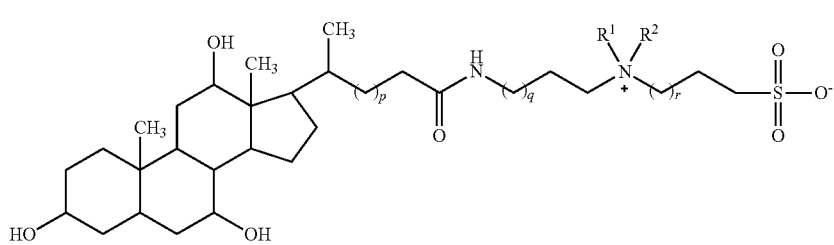

[Formula 1]

In Formula 1, $R^1$ and $R^2$ are each independently a straight-chain alkyl group or branched-chain alkyl group having 1 to 10 carbon atoms, and p, q, and r are each independently integers in a range of 0 to 10.

In a still further aspect, a still further objective of the present invention is to provide a method of enhancing the clearing efficiency of a biological sample having a size of 1 mm or less, the method including treating a biological sample that is fixed and has a size of 1 mm or less with a pretreatment solution including phosphate-buffered saline (PBS).

In a still yet further aspect, a still yet further objective of the present invention is to provide a method of reducing the damage of a biological sample having a size of 1 mm or less during a process of clearing the biological sample, the method including treating a biological sample that is fixed and has a size of 1 mm or less with a pretreatment solution including phosphate-buffered saline (PBS).

Technical Solution

In order to accomplish the above objectives, an aspect of the present invention provides a clearing pretreatment method of a biological sample having a size of 1 mm or less, the method including treating a biological sample that is fixed and has a size of 1 mm or less with a pretreatment solution including phosphate-buffered saline (PBS).

In addition, another aspect of the present invention provides a clearing method of a biological sample having a size of 1 mm or less, the method including: pretreating a biological sample that is fixed and has a size of 1 mm or less with a pretreatment solution including phosphate-buffered saline (PBS); and clearing the resulting pretreated biological sample by bringing the pretreated biological sample into contact with the clearing agent including a compound represented by Formula 1, an optical isomer of the compound represented by Formula 1, a hydrate of the compound represented by Formula 1, or a salt of the compound represented by Formula 1.

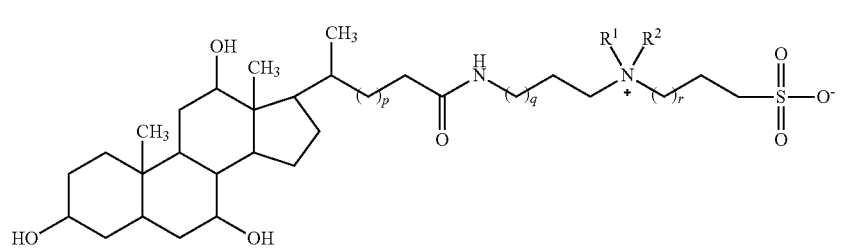

[Formula 1]

In Formula 1, $R^1$ and $R^2$ are each independently a straight-chain alkyl group or branched-chain alkyl group having 1 to 10 carbon atoms, and p, q, and r are each independently integers in a range of 0 to 10.

Furthermore, a further aspect of the present invention provides a clearing pretreatment composition for a biological sample having a size of 1 mm or less, the composition including phosphate-buffered saline (PBS).

In addition, a yet further aspect of the present invention provides a clearing kit for a biological sample having a size of 1 mm or less, the kit including: a clearing pretreatment composition for a biological sample having a size of 1 mm or less, the composition including phosphate-buffered saline (PBS); and a clearing agent including a compound represented by Formula 1, an optical isomer of the compound represented by Formula 1, a hydrate of the compound represented by Formula 1, or a salt of the compound represented by Formula 1.

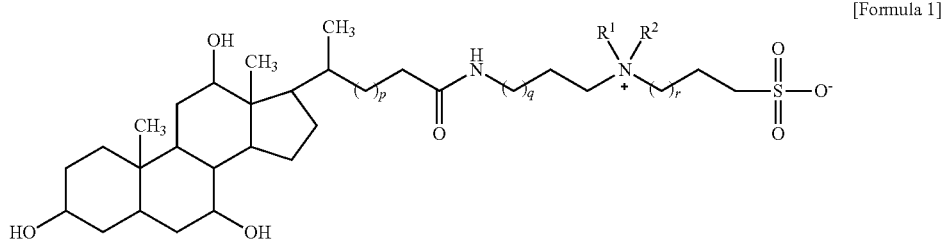

[Formula 1]

In Formula 1,
$R^1$ and $R^2$ are each independently a straight-chain alkyl group or branched-chain alkyl group having 1-10 carbon atoms, and
p, q, and r are each independently integers in a range of 0 to 10.

Furthermore, a still further aspect of the present invention provides a method of enhancing the clearing efficiency of a biological sample having a size of 1 mm or less,
the method including treating a biological sample that is fixed and has a size of 1 mm or less with a pretreatment solution including phosphate-buffered saline (PBS).

In addition, a still yet further aspect of the present invention
provides a method of reducing the damage of a biological sample having a size of 1 mm or less during a process of clearing the biological sample,
the method including treating a biological sample that is fixed and has a size of 1 mm or less with a pretreatment solution including phosphate-buffered saline (PBS).

Advantageous Effects

A clearing pretreatment method of a biological sample having a size of 1 mm or less, that is, a spheroid or organoid, according to the present invention uses a phosphate-buffered saline (PBS) rather than an existing sucrose solution as a pretreatment solution, thus solving the problem in which the spheroid or organoid floats above the surface of water due to the density difference such that the structure of the sample is damaged. Therefore, there is an effect in that the spheroid or organoid can be transparentized while maintaining the original shape thereof, thus making it possible to image deep parts.

BEST MODE

Figure 1:
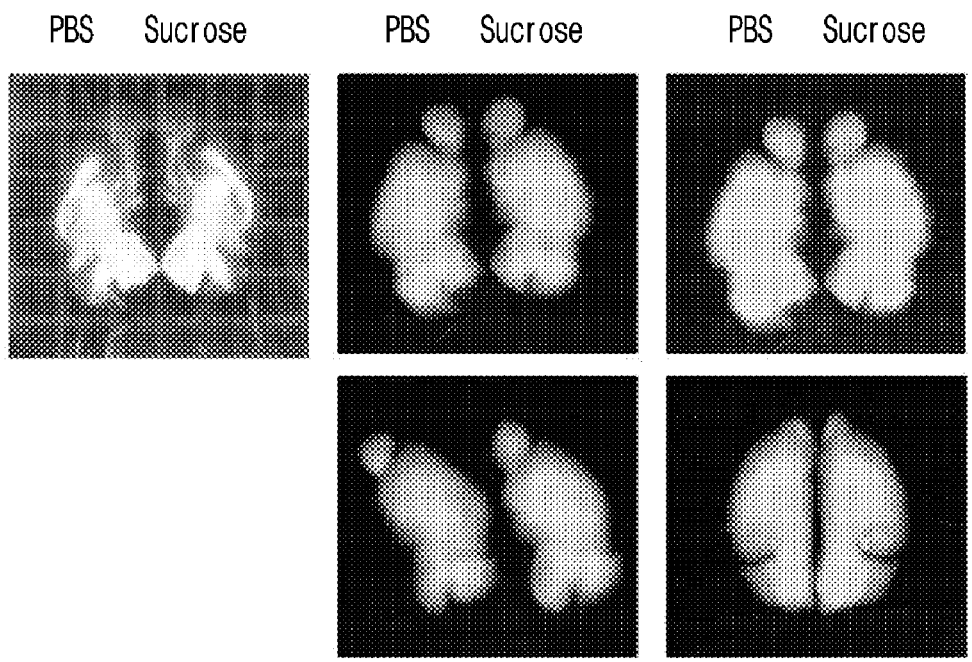
FIG. 1 is an image showing comparison results of transparency level and fluorescence level for the brains of mice according to the type of a pretreatment solution.

Hereinafter, the present invention will be described in detail.

On the other hand, the embodiment of the present invention may be variously modified in many different forms, and the scope of the present invention is not limited to the embodiments described below. In addition, the embodiments of the present invention are provided for allowing those skilled in the art to more clearly comprehend the present invention.

Furthermore, unless the context clearly indicates otherwise, it will be further understood that the terms "comprises", "comprising", "includes", and/or "including", when used herein, specify the presence of other elements, but do not preclude the presence of other elements.

An aspect of the present invention
provides a clearing pretreatment method of a biological sample having a size of 1 mm or less,
the method including treating a biological sample that is fixed and has a size of 1 mm or less with a pretreatment solution including phosphate-buffered saline (PBS).

In this case, the biological sample may be a spheroid or an organoid. In addition, the spheroid or organoid may be formed from a cell derived from brain, blood vessels, liver, lungs, kidneys, pancreas, stomach, or intestines.

The biological sample, that is, the spheroid or organoid, may have an average diameter in a range of 0.05 mm to 1 mm.

In order to give some examples of an average diameter of the biological sample,
the biological sample may have an average diameter in a range of 0.05 mm to 1 mm, a range of 0.10 mm to 1 mm, a range of 0.15 mm to 1 mm, a range of 0.20 mm to 1 mm, a range of 0.25 mm to 1 mm, a range of 0.30 mm to 1 mm, a range of 0.35 mm to 1 mm, a range of 0.40 mm to 1 mm, a range of 0.45 mm to 1 mm, a range of 0.50 mm to 1 mm, a range of 0.55 mm to 1 mm, a range of 0.60 mm to 1 mm, a range of 0.65 mm to 1 mm, a range of 0.70 mm to 1 mm, a range of 0.75 mm to 1 mm, or a range of 0.80 mm to 1 mm. The present invention is an invention derived to overcome the problem in which the biological sample floats above the surface of the pretreatment solution during the pretreatment process when clearing the biological sample having an average diameter smaller than that of general biological tissues. When an object subjected to clearing is the biological sample having a size within the above range, the effects demonstrated in the present invention, typically, effects of preventing structural damage in the pretreatment process and the like, may occur.

The biological sample that is fixed and has a size of 1 mm or less may be a biological sample fixed with at least one selected from the group consisting of paraformaldehyde, ethylene glycol diglycidyl ether, dipropylene glycol diglycidyl ether, 1,4-butanediol diglycidyl ether, glycerol polyglycidyl ether, glutaraldehyde, and polyacrylamide. Preferably, in the exemplary embodiment of present invention, paraformaldehyde is used.

Another aspect of the present invention provides a clearing method of a biological sample having a size of 1 mm or less, the method including: pretreating a biological sample that is fixed and has a size of 1 mm or less with a pretreatment solution including phosphate-buffered saline (PBS); and clearing the resulting pretreated biological sample by bringing the pretreated biological sample into contact with a clearing agent including a compound represented by Formula 1, an optical isomer of the compound represented by Formula 1, a hydrate of the compound represented by Formula 1, or a salt of the compound represented by Formula 1.

In Formula 1, $R^1$ and $R^2$ are each independently a straight-chain alkyl group or branched-chain alkyl group having 1 to 10 carbon atoms, and p, q, and r are each independently integers in a range of 0 to 10.

Preferably, $R^1$ and $R^2$ are each independently a straight-chain alkyl group or branched-chain alkyl group having 1 to 5 carbon atoms, and p, q, and r are each independently integers in a range of 0 to 5.

More preferably, $R^1$ and $R^2$ are each independently methyl, and p, q, and r are each independently an integer of 1.

Most preferably, the compound represented by Formula 1 is a compound represented by Formula 2 or a hydrate of the compound represented by Formula 2.

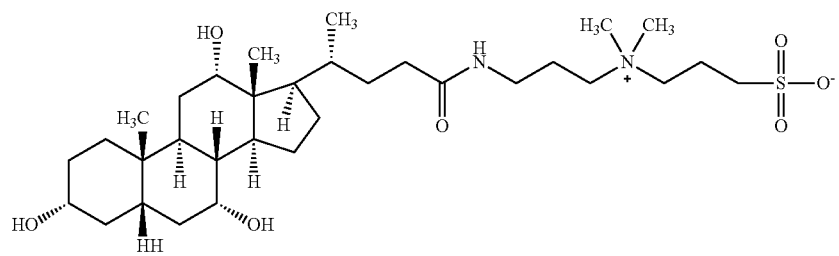

[Formula 2]

The clearing agent may include the CHAPS compound represented by Formula 2 or a hydrate of the compound represented by Formula 2 in a concentration range of 2% w/v (% weight/volume) to 55% w/v (% weight/volume). Preferably, the clearing agent includes CHAPS in the concentration range of 4% w/v to 50% w/v. In this case, a solution for exhibiting a concentration in the above range may be a simulated body fluid used in the art. More specifically, distilled water, phosphate-buffer saline (PBS), tris-buffer solution (TBS), or the like can be used. However, the solution for exhibiting the concentration is not limited thereto. When the clearing agent includes the CHAPS compound in the concentration of less than 2% w/v, the clearing rate of the biological tissue may be significantly slowed down. In addition, when the clearing agent includes the CHAPS compound in the concentration of more than 55% w/v, the CHAPS compound may not be fully dissolved in the clearing agent.

In addition, the clearing agent may further include at least one selected from the group consisting of 3-([3-cholami-

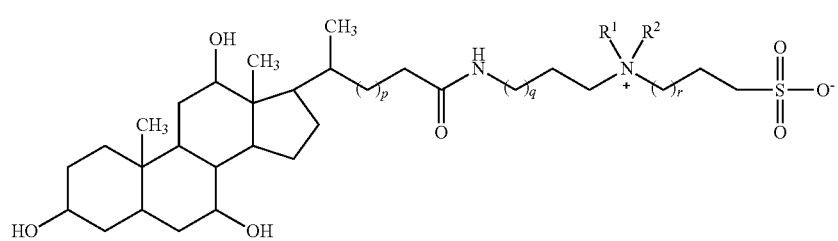

[Formula 1]

dopropyl]dimethylammonio)-2-hydroxy-1-propane-sulfonate (CHAPSO), sucrose, fructose, glycerol, diatrizoic acid, Triton X-100, Tween 20, 2,2'-thiodiethanol, iohexol, and chloral hydrate. Preferably, the clearing agent further includes urea. The above component plays a role in accelerating clearing of the biological sample by controlling osmotic pressure.

The clearing agent may include the above substance accelerating clearing of the biological sample in a concentration range of 5% w/v to 80% w/v, a concentration range of 5% w/v to 75% w/v, a concentration range of 10% w/v to 70% w/v, a concentration range of 5% w/v to 50% w/v, or a concentration range of 35% w/v to 60% w/v. In this case, when the clearing agent includes the substance in the concentration of less than 5% w/v, the clearing rate of the biological tissue may be slowed down. In addition, when the clearing agent includes the substance in the concentration of more than 80% w/v, crystallization may occur, or the material may not be dissolved in the solution.

As a specific example, when urea is used as the substance accelerating clearing of the biological sample, the clearing agent may include urea in a concentration range of 10% w/v to 70% w/v, and preferably, in the concentration range of 20% w/v to 60% w/v. In addition, the concentration of the material accelerating clearing of the biological sample may be appropriately adjusted in conjunction with the preferred concentration range of the CHAPS compound.

The clearing method of the biological tissue may be performed in a temperature range of 4° C. to 50° C., a temperature range of 10° C. to 50° C., a temperature range of 12° C. to 48° C., a temperature range of 14 to 46° C., a temperature range of 16° C. to 44° C., a temperature range of 18° C. to 42° C., a temperature range of 20° C. to 40° C., a temperature range of 24° C. to 39° C., a temperature range of 28° C. to 38° C., a temperature range of 30° C. to 37° C., or a temperature range of 33° C. to 34° C.

Furthermore, after the pretreating of the biological sample and before the clearing of the biological sample by bringing the biological sample into contact with the clearing agent, the clearing method may further include treating the biological sample with agarose. As the biological sample is further treated with agarose, damage to the spheroid or organoid may be minimized and the structure of the spheroid or organoid may be maintained.

A further aspect of the present invention provides a clearing pretreatment composition for a biological sample having a size of 1 mm or less, the composition including phosphate-buffered saline (PBS)

Yet another aspect of the present invention provides a clearing kit for a biological sample having a size of 1 mm or less, the kit including: a clearing pretreatment composition for a biological sample having a size of 1 mm or less, the composition including phosphate-buffered saline (PBS); and a clearing agent including a compound represented by Formula 1, an optical isomer of the compound represented by Formula 1, a hydrate of the compound represented by Formula 1, or a salt of the compound represented by Formula 1.

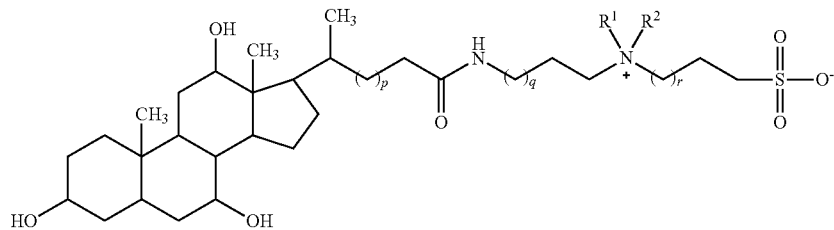

[Formula 1]

In Formula 1, $R^1$ and $R^2$ are each independently a straight-chain alkyl group or branched-chain alkyl group having 1-10 carbon atoms, and p, q, and r are each independently integers in a range of 0 to 10.

In this case, the clearing agent may further include at least one selected from the group consisting of 3-([3-cholamidopropyl]dimethylammonio)-2-hydroxy-1-propane-sulfonate (CHAPSO), sucrose, fructose, glycerol, diatrizoic acid, Triton X-100, Tween 20, 2,2'-thiodiethanol, iohexol, and chloral hydrate. Preferably, the clearing agent further includes urea.

Still another aspect of the present invention provides a method of enhancing the clearing efficiency of a biological sample having a size of 1 mm or less, the method including treating a biological sample that is fixed and has a size of 1 mm or less with a pretreatment solution including phosphate-buffered saline (PBS).

A Yet further aspect of the present invention provides a method of reducing the damage of a biological sample having a size of 1 mm or less during a process of clearing the biological sample, the method including treating a biological sample that is fixed and has a size of 1 mm or less with a pretreatment solution including phosphate-buffered saline (PBS).

The clearing method, according to an aspect of the present invention, can solve the problem in which the tissue floats above when clearing the small sample, which is the spheroid or organoid, having a size of 1 mm or less, the problem in which the tissue is damaged can be solved. In addition, the clearing method has an effect of enabling researchers to confirm the sample location. Furthermore, a protocol allowing researchers to easily screen the efficacy and toxicity of new drugs can be established by applying the techniques of high-throughput imaging and clearing to three-dimensional images of living cells. The clearing method enables rather precise analysis and evaluation at the same time by applying such a clearing process to human-derived cancer organoids, which can be effectively used for the identification of causes of various diseases, treatments, and furthermore, evaluation of the efficacy and toxicity of new drugs.

Mode for Invention

Hereinafter, the present invention will be described in detail with reference to embodiments and Experimental Examples.

However, the following embodiments and Experimental Examples are only intended to describe the exemplary embodiments of the present invention, and the scope of the present invention is not limited to the following embodiments and experimental examples.

<Experimental Example 1> Comparison of Transparency Level of Brains of Mice According to Type of Pretreatment Solution The following experiment was performed to compare the transparency level of the brains of mice according to the type of a pretreatment solution (1×PBS or 40% w/v sucrose). In this case, all the animal test described herein was performed according to the guidance (Approval No. RS17003) of Committee for Animal Resources, Korea Institute of Toxicology.

1-1: Fixation

First, adult mice (8 weeks old) were anesthetized with isoflurane at a flow rate of 1 cc/min, which is an inhalation anesthetic, and 50 mL of cold 1×PBS, followed by 4% cold paraformaldehyde (PFA), was perfused transcardially.

Then, organs were extracted, immersed in 4% PFA (aqueous solution), and incubated at a temperature of 4° C. for 24 hours. In this case, the range of a cold temperature is not particularly limited and may be in a range of 0° C. to 10° C.

1-2: Pretreatment

Next, pretreatment was performed by incubating the above samples (organs) in 1×PBS or a 40% sucrose solution in a temperature range of 0° C. to 10° C. for 24 hours. In this case, the 1×PBS was phosphate-buffered saline (PBS) having a PH of about 7.4 and a salinity of 10 mM $PO_4^{3-}$, 137 mM NaCl, and 2.7 mM KCl. In addition, the concentration unit of the 40% sucrose solution was in % w/v (% weight/volume), and an aqueous solution was used as the sucrose solution.

1-3: Clearing

In order to transparentize each of the fully pretreated samples, an aqueous solution mixture of 20% w/v CHAPS, 50% w/v urea, and 50 mM sodium azide was mixed at a speed of 100 rpm at a temperature of 35° C. for 5 hours and incubated for and 48 hours. In this case, the CHAPS is a compound represented by Formula 1 in the specification or a hydrate of the compound represented by Formula 1.

1-4: Result

The transparency level of the brains of the mice according to the type of the pretreatment solution was compared through the fluorescence level. In this case, the difference in loss of green fluorescent protein (GFP) fluorescence between the two pretreatment solutions in the process of brain tissue clearing of the genetically modified fluorescent mice was compared through a fluorescence image. The results are shown in FIG. 1.

FIG. 1 is an image showing comparison results of the transparency level and fluorescence level for the brains of mice according to the type of the pretreatment solution.

As shown in FIG. 1, it was confirmed that the 1×PBS pretreatment solution, used as a pretreatment solution for the clearing of the brains of the mice, consequentially induced clearing well enough to replace the 40% w/v (% weight/volume) sucrose pretreatment solution disclosed in Patent Document, KR 10-2017-0105551.

As described above, in the case of clearing a spheroid or an organoid having a size of 1 mm or less, when performing pretreatment with the 40% w/v (% weight/volume) sucrose solution disclosed in Patent Document, KR 10-2017-0105551, the spheroid or the organoid floated above a surface of the pretreatment solution due to the density difference. As a result, the fragile structure of the sample, which is the spheroid or the organoid, was damaged, so there was a problem in that it was impossible to meaningfully observe the internal structure of the sample even after performing clearing. On the other hand, the density difference between the 1×PBS pretreatment solution and the spheroid or organoid was insignificant, and thus the damage to the structure of the sample could be minimized. Therefore, it was confirmed that the 1×PBS pretreatment solution was effectively used in the clearing process of the spheroid or the organoid through the present experiment.

<Experimental Example 2> Immunostaining and Clearing of Human-Derived Cancer Organoids The following experiment was performed to evaluate whether the immunostaining and clearing of cancer organoids were actually well induced as pretreatment process with 1× phosphate-buffered saline (PBS) was included.

2-1: Preparation of human-derived organoids

Figure 2:
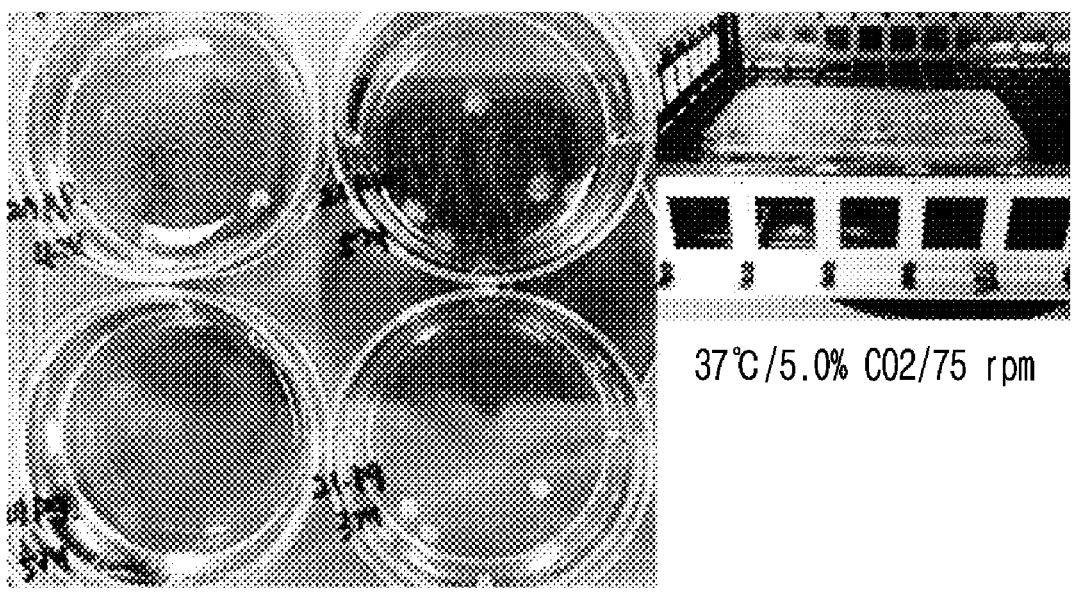
FIG. 2 is an image of organoid samples being cultured in neuron culture mediums in a preparation process of human-derived organoids in 2-1 of Experimental Example 2.

In order to prepare human-derived organoids, tissue from a glioblastoma patient was separated into single cells and mixed with 20 μL of matrigel on paraffin film at Seoul National University College of Medicine. When being cultured in an incubator at a temperature of 37° C., the samples formed a hemispherical shape having a size of 1 mm, which was in a jellified state. Then, the samples were put in a neuron culture medium and grown for 4 days. After 4 days, the samples were cultured while being shaken at a speed in a range of 60 RPM to 80 RPM on an orbital shaker (FIG. 2). FIG. 2 is an image of the organoid samples being cultured in neuron culture mediums in the preparation process of the human-derived organoids in 2-1 of Experimental Example 2. When the culture medium was refreshed once every 3 days for growth, the human-derived cancer organoids were prepared after 4 weeks.

2-2: Observation of organoids without performing clearing

The cancer organoid samples were transferred to an ibidi 8-well chamber, and images of the organoids before and after treating the organoids with temozolomide, used to treat brain tumors, were imaged three-dimensionally with a Leica Thunder microscope. Normal nuclear staining for three-dimensional fluorescence images was processed with Hoechst (blue color) and PI (red color), used as a dead cell marker. The Hoechst/PI ratio, before and after treating the organoids with temozolomide, is shown in FIGS. 3 and 4 using a Thunder imager.

Figure 3:
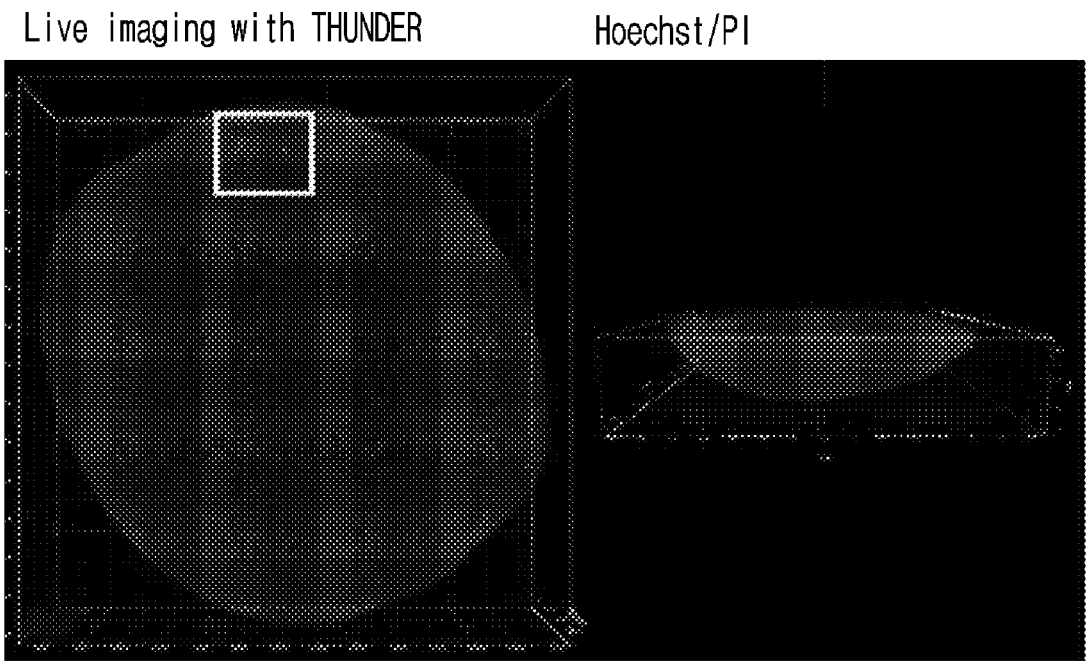
FIG. 3 is an image showing the analysis result of the Hoechst/PI ratio with a Thunder imager, the analysis being performed before treating the human-derived cancer organoid sample, prepared in 2-1 of Experimental Example 2, with temozolomide.

FIG. 3 is an image showing the analysis result of the Hoechst/PI ratio with a Thunder imager, the analysis being performed before treating the human-derived cancer organoid samples, prepared in 2-1 of Experimental Example 2, with temozolomide.

Figure 4:
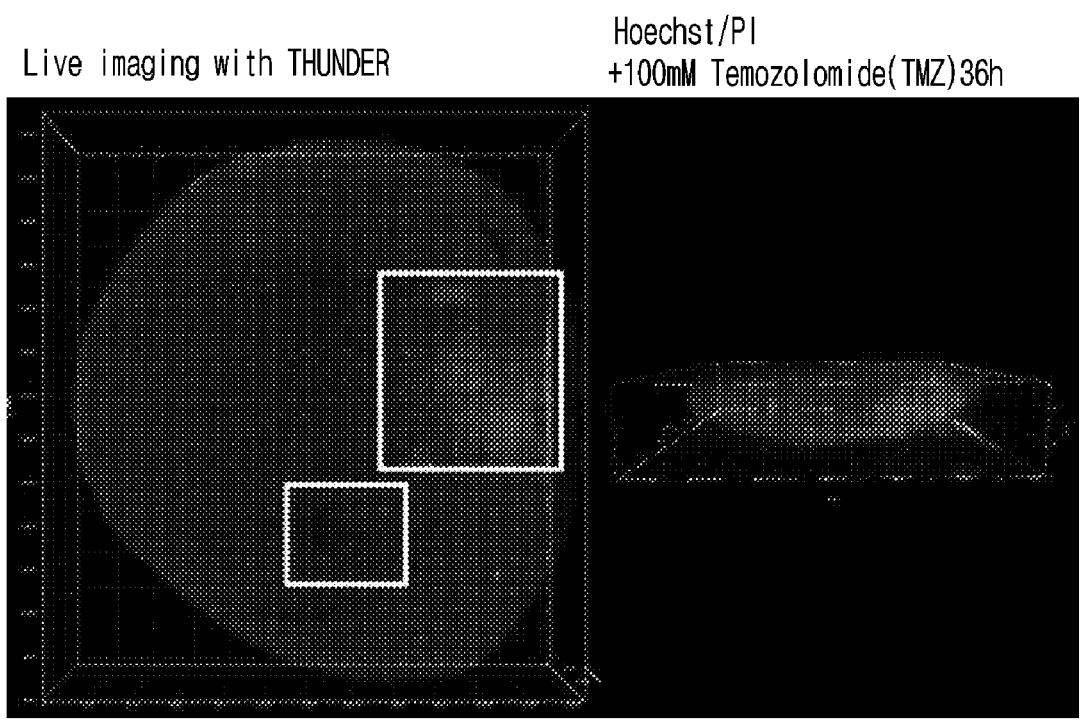
FIG. 4 is an image showing the analysis result of the Hoechst/PI ratio with a Thunder imager, the analysis being performed after treating the human-derived cancer organoid sample, prepared in 2-1 of Experimental Example 2, with temozolomide.

FIG. 4 is an image showing the analysis result of the Hoechst/PI ratio with a Thunder imager, the analysis being performed after treating the human-derived cancer organoid samples, prepared in 2-1 of Experimental Example 2, with temozolomide.

Referring to the Hoechst/PI ratio of the human-derived cancer organoid samples analyzed with the Thunder imager before treating the samples with temozolomide, it was confirmed that almost no dead cells were found (FIG. 3). On the other hand, referring to the Hoechst/PI ratio of the human-derived cancer organoid samples analyzed with the Thunder imager after treating the samples with temozolomide (FIG. 4), it was confirmed that the number of the dead cells increased compared to that in the case before treating the samples with temozolomide.

2-3: Clearing method of cancer organoids including pretreatment process with 1×PBS When the amount of cell death caused by temozolomide in the cancer organoids increased, a tissue clearing technique was required to be used to precisely analyze the samples in further detail. In addition, unlike clearing of large biological tissues such as a brain of a mouse, the pretreatment process with the 1× phosphate-buffered saline (PBS) was essential to smoothly induce clearing of the organoids.

The clearing process for the cancer organoids was as follows.

A. Fixation

First, the human-derived cancer organoids were treated with temozolomide, used to treat brain tumors, and incubated for 36 hours. After 36 hours of incubation, PBS was added to the human-derived cancer organoid to remove the culture medium. After removing the PBS, the human-derived cancer organoids were treated with 4% paraformaldehyde (PFA) to fix the organoids at a temperature of 4° C. for 1 hour.

B. Pretreatment

The fixed organoids were transferred with 1×PBS and placed on the orbital shaker at a temperature of 4° C. for 24 hours. The cancer organoids were transferred to an ibidi 8-well chamber. Then, a solution in which 0.8% agarose was dissolved was cooled to 60° C. and poured into the well chamber including the cancer organoids to fix the organoids. In this case, the agarose played a role in minimizing damage to the cancer organoids and maintaining the structure thereof.

C. Clearing

The organoids were treated with a clearing solution for biological tissue (40% w/v CHAPS and 40% w/v urea) and incubated at a speed of 100 rpm at a temperature of 37° C. for 24 hours. After the incubation, the solution was refreshed with distilled water three times for 2 hours to remove the clearing solution for biological tissue. The organoids were once again treated with the clearing solution for biological tissue (40% w/v CHAPS and 40% w/v urea) and incubated at a speed of 100 rpm at a temperature of 37° C. for 24 hours. After the incubation, the solution was refreshed with distilled water three times for 2 hours to remove the clearing solution for biological tissue.

Figure 5:
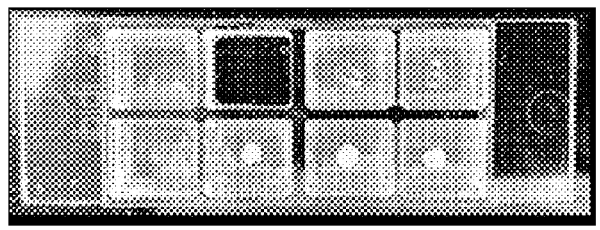
FIG. 5 is an image of samples in an ibidi 8-well chamber being observed with bare eyes before and after performing clearing of cancer organoids.
Figure 5:
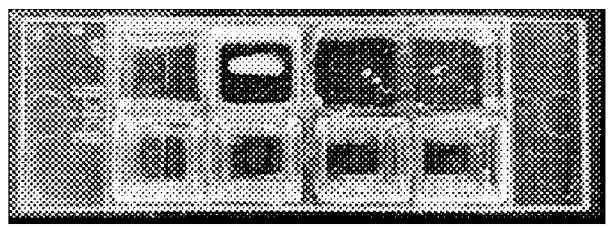

FIG. 5 is an image of samples in the ibidi 8-well chamber being observed with bare eyes before and after performing clearing of the cancer organoids.

Next, in order to secure a space for antibodies to enter the cancer organoid tissue, the organoids were treated with a treatment solution for tissue infiltration (0.2% Triton X-100, 10% DMSO, and 0.1×PBS) at a temperature of 4° C. for 4 hours. After the incubation, the solution was refreshed with distilled water three times for 2 hours to remove the treatment solution for tissue infiltration. A primary antibody was diluted 1:100 in a solution including 0.1×PBS, 0.01% sodium azide, and 0.1% Tween 20, and the cancer organoid samples were treated with the solution and incubated at a temperature of 4° C. for 2 days. Then, the primary antibody was removed from the cancer organoid tissue by being refreshed with a 0.1×PBS solution 3 times for 3 hours. A secondary antibody was diluted 1:100 in the solution including 0.1×PBS, 0.01% sodium azide, and 0.1% Tween 20, and the cancer organoid samples were treated with the solution and incubated at a temperature of 4° C. for 2 days. Lastly, the secondary antibody was removed from the cancer organoid tissue by being refreshed with the 0.1×PBS solution 3 times for 3 hours. For nuclear staining, the samples were treated with DAPI (sigma Cat #D 9542) for 1 hours. Residual staining reagent was removed with distilled water. The cancer organoid samples were put into the clearing solution for biological tissue (40% w/v CHAPS and 40% w/v urea) and incubated at a speed of 100 rpm at a temperature of 37° C. for 24 hours.

As shown in the above results, it was confirmed that when applying clearing technique to the human-derived cancer organoids of the present invention, researchers were allowed to easily prepare the samples for clearing of cancer organoids and transparentize the samples at the same time.

Figure 6:
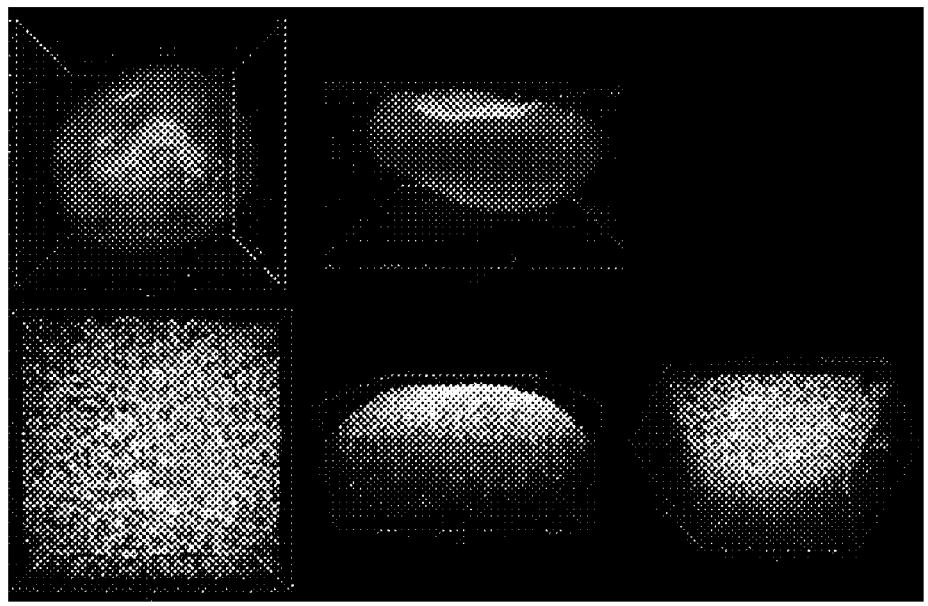
FIG. 6 is an image showing analysis results of DAPI, green fluorescence, and red fluorescence signals with 5× and 20× objective lenses of a macro laser light-sheet illumination imaging system confocal microscope, the analysis being performed to obtain three-dimensional bioimages of cancer organoids transparentized in a process including pretreatment with 1×PBS.
Figure 7:
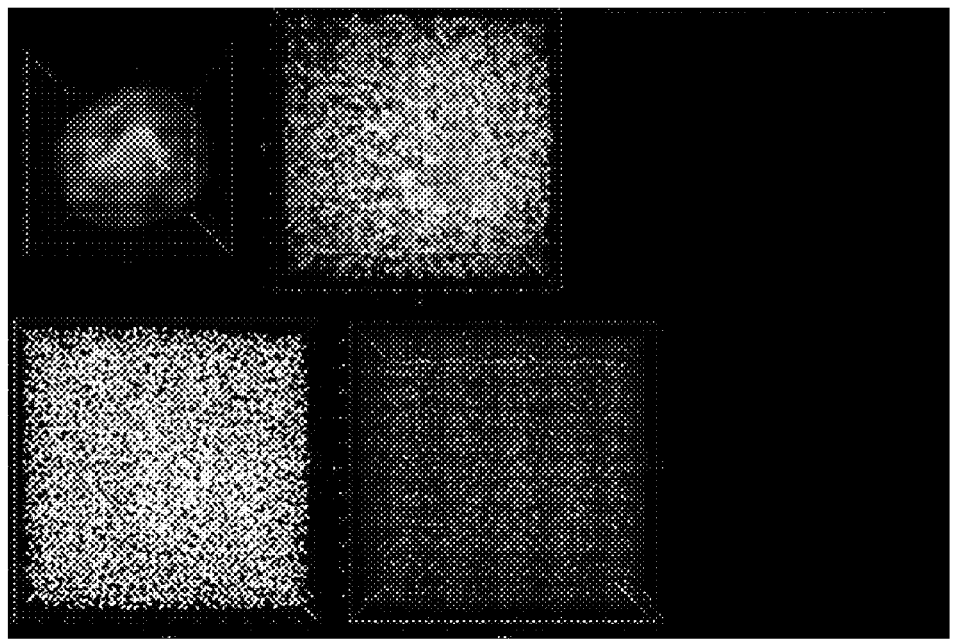
FIG. 7 is an image showing analysis results of DAPI, green fluorescence, and red fluorescence signals with 5× and 20× objective lenses of a macro laser light-sheet illumination imaging system confocal microscope, the analysis being performed to obtain three-dimensional bioimages of cancer organoids transparentized in a process including pretreatment with 1×PBS and to confirm that the bioimages of the cancer organoids in deep parts can be obtained.

<Experimental Example 3> Observation of Cellular-Level Structure and Distribution of Organoids, and Analysis of Organoids in Deep Parts Through Immunostaining of Transparentized Organoids In order to analyze the cell distribution and structure of the human-derived cancer organoid tissue transparentized through the processes A to C constituting 2-3 of Experimental Example 2, the cancer organoids were treated with vimentin antibody, used as a marker for mesenchymal cells. In addition, since the cancer organoids were a sample of brain tumor, Tuj1 antibody, used as a marker for neurons, was treated to analyze the distribution of neurons. In order to obtain three-dimensional bioimages, DAPI, green fluorescence, and red fluorescence signals were analyzed with 5× and 20× objective lenses of a macro laser light-sheet illumination imaging system confocal microscope (FIG. 6). FIG. 6 is an image showing analysis results of DAPI, green fluorescence, and red fluorescence signals with 5× and 20× objective lenses of a macro laser light-sheet illumination imaging system confocal microscope, the analysis being performed to obtain three-dimensional bioimages of the cancer organoids transparentized in the process including pretreatment with 1×PBS. Each and every shape of the mesenchymal cell and the shapes of neuron and nuclei were clearly shown three-dimensionally. Furthermore, it was confirmed that obtaining an image of the cancer organoids in deep parts was possible (FIG. 7). FIG. 7 is an image showing analysis results of DAPI, green fluorescence, and red fluorescence signals with 5× and 20× objective lenses of a macro laser light-sheet illumination imaging system confocal microscope, the analysis being performed to obtain three-dimensional bioimages of a cancer organoid transparentized in a process including pretreatment with 1×PBS and to confirm that the bioimages of the cancer organoid in deep parts can be obtained.

Moreover, in order to indicate the importance of three-dimensional configuration, Imaris software was used to enable the quantification of the number of cells per unit area (FIG. 7). With the Imaris software, drug efficacy and toxicity could be quantified and analyzed three-dimensionally in new-drug development, resulting in much more objective and quantitative evaluation than that analyzed two-dimensionally.

Therefore, the clearing method of the present invention, including the pretreatment process with phosphate-buffered saline (PBS), can easily and quickly transparentize the spheroids or organoids, which can be useful for imaging the spheroids or organoids. In addition, the clearing method can be effectively used for the identification n of causes of various diseases, treatments, and prediction of the efficacy and toxicity of drugs. Furthermore, the clearing method can be used by being incorporated into various medical devices, and particularly, can be applied to manufacturing a kit which can be effectively used as an in vitro diagnostic device.

INDUSTRIAL APPLICABILITY

A clearing pretreatment method of a biological sample having a size of 1 mm or less, that is, a spheroid or organoid, according to the present invention uses a phosphate-buffered saline (PBS) rather than an existing sucrose solution as a pretreatment solution, thus solving the problem in which the spheroid or organoid floats above the surface of water due to the density difference such that the structure of the sample is damaged. Therefore, there is an effect in that the spheroid or organoid can be transparentized while maintaining the original shape thereof, thus making it possible to image deep parts.

The invention claimed is:

1. A clearing method of a biological sample having a size of 1 mm or less, the method comprising:
    fixing a biological sample having a size of 1 mm or less;
    pretreating the fixed biological sample by contacting the fixed biological sample with a pretreatment solution consisting of phosphate-buffered saline (PBS) and incubating at 0° C. to 10° C.; and
    clearing the resulting pretreated biological sample by bringing the pretreated biological sample into contact with a clearing agent comprising a 3-[(3-cholamidopropyl)-dimethylammonio]-propane-sulfonate (CHAPS) compound of Formula 2 or a hydrate thereof in an amount of 2 to 55 w/v %, and urea in an amount of 10 to 70 w/v %,

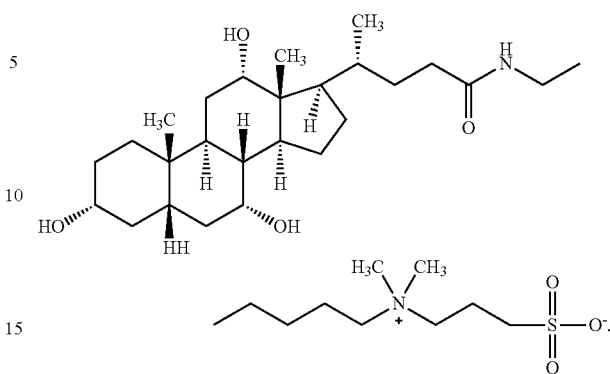

Formula 2

2. The method of claim 1, wherein the biological sample is a spheroid or an organoid.

3. The method of claim 2, wherein the spheroid or organoid is formed from a cell derived from brain, blood vessels, liver, lungs, kidneys, pancreas, stomach, or intestines.

4. The method of claim 1, wherein the biological sample has an average diameter in a range of 0.05 mm to 1 mm.

5. The method of claim 1, wherein the biological sample is fixed by contacting the biological sample with at least one selected from the group consisting of paraformaldehyde, ethylene glycol diglycidyl ether, dipropylene glycol diglycidyl ether, 1,4-butanediol diglycidyl ether, glycerol polyglycidyl ether, glutaraldehyde, and polyacrylamide.

6. The method of claim 1, further comprising contacting the pretreated biological sample, which has been removed or transferred from the PBS pretreatment solution, with agarose after the pretreating of the biological sample with PBS and before the clearing of the biological sample.

* * * * *